United States Patent
McIntyre

(10) Patent No.: US 8,544,590 B2
(45) Date of Patent: Oct. 1, 2013

(54) ACTIVE HINGE WITH RESET MECHANISM

(75) Inventor: Andrew McIntyre, Midland (CA)

(73) Assignee: M&C Corporation, Sterling Heights, MI (US)

( * ) Notice: Subject to any disclaimer, the term of this patent is extended or adjusted under 35 U.S.C. 154(b) by 0 days.

(21) Appl. No.: 13/559,856

(22) Filed: Jul. 27, 2012

(65) Prior Publication Data

US 2013/0025958 A1  Jan. 31, 2013

Related U.S. Application Data

(60) Provisional application No. 61/513,114, filed on Jul. 29, 2011.

(51) Int. Cl.
*B60R 21/38* (2011.01)
(52) U.S. Cl.
USPC .......................................................... 180/274
(58) Field of Classification Search
CPC ............ B60R 21/34; B60R 21/38; E05D 3/06
USPC ............. 180/69.2, 69.21, 274; 16/357, 360, 16/361, 366, 368, 369; 296/187.04, 193.11
See application file for complete search history.

(56) References Cited

U.S. PATENT DOCUMENTS

| | | | | |
|---|---|---|---|---|
| 4,727,621 | A * | 3/1988 | Emery et al. | 16/239 |
| 7,596,833 | B2 * | 10/2009 | Erwin | 16/370 |
| 7,802,345 | B2 * | 9/2010 | Mathew et al. | 16/370 |
| 7,845,053 | B2 * | 12/2010 | Marsh et al. | 16/357 |
| 7,854,289 | B2 * | 12/2010 | Gust | 180/274 |
| 7,987,939 | B2 * | 8/2011 | Kisiler et al. | 180/69.2 |
| 2009/0288271 | A1 * | 11/2009 | Kmieciak et al. | 16/308 |
| 2009/0289473 | A1 * | 11/2009 | Kmieciak | 296/193.11 |

\* cited by examiner

*Primary Examiner* — Joseph Rocca
(74) *Attorney, Agent, or Firm* — Nixon & Vanderhye, P.C.

(57) ABSTRACT

An active hinge with a reset mechanism that disables an additional degree of freedom in the hinge's movement to permit the trailing edge of a vehicle hood to lift is disclosed. The active hinge includes a deployment bracket on which a reset clip is mounted, a hood bracket for attachment to the vehicle's hood, and a body bracket for attachment to the vehicle's body. To re-lock the movement between the deployment bracket and the hood bracket resulting from the hood bracket rotating around a degree of freedom pivot, an engagement tab on the reset clip enters a notch in the hood bracket so that reset clip rotates until a locking tab on the clip engages a hole in the deployment bracket. The locking tab engaging the hole prevents further rotation of the hood bracket in either direction, to thereby maintain the active hinge in a reset position.

20 Claims, 8 Drawing Sheets

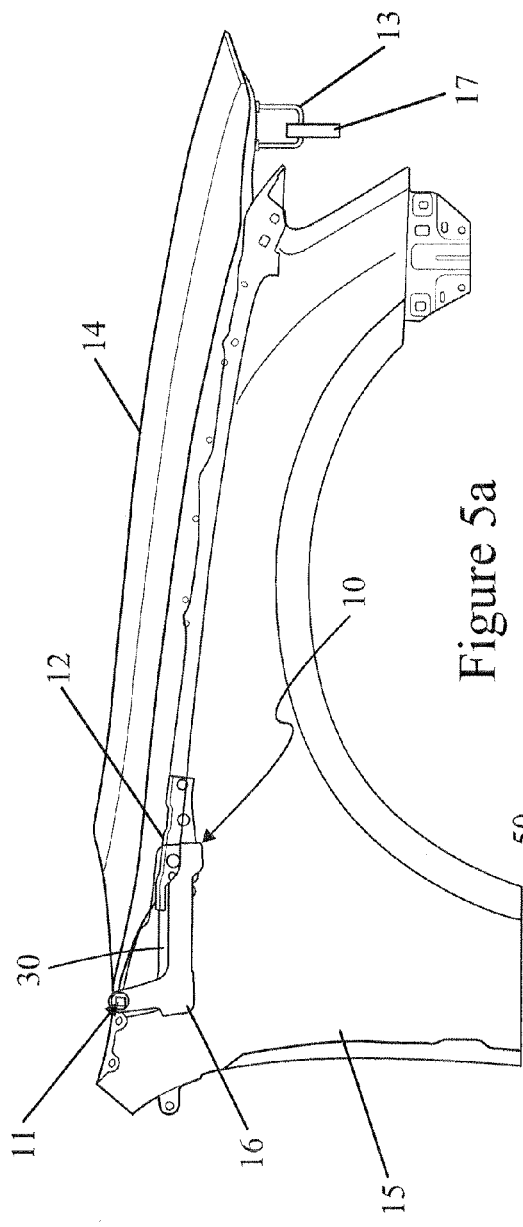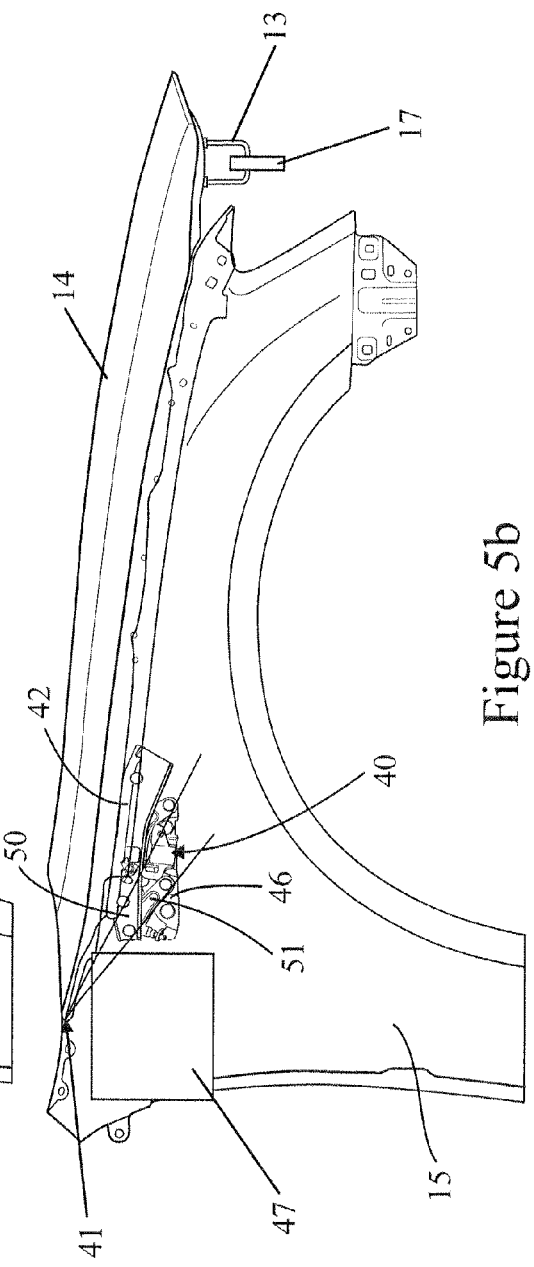

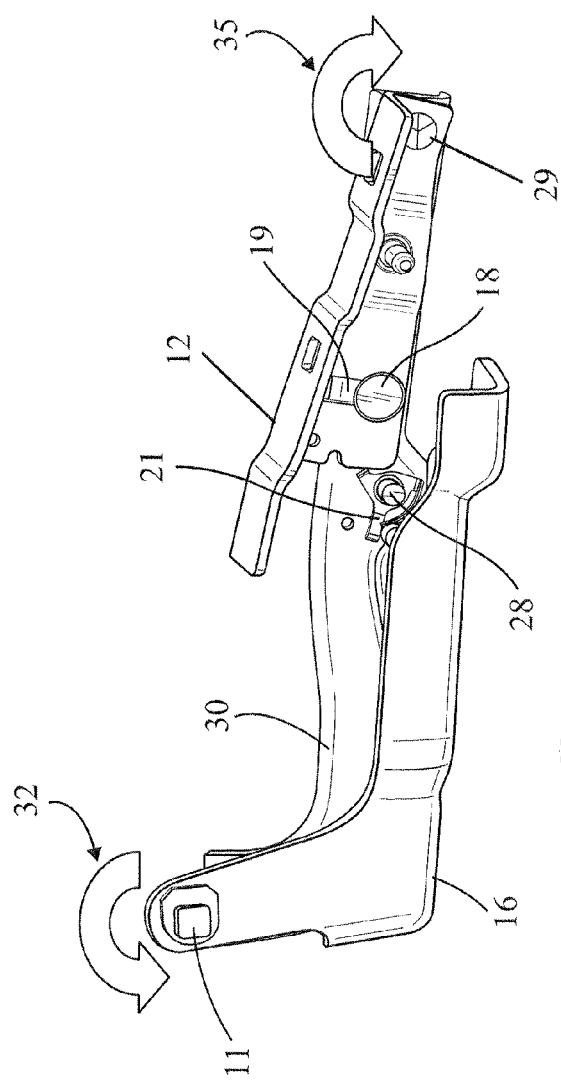
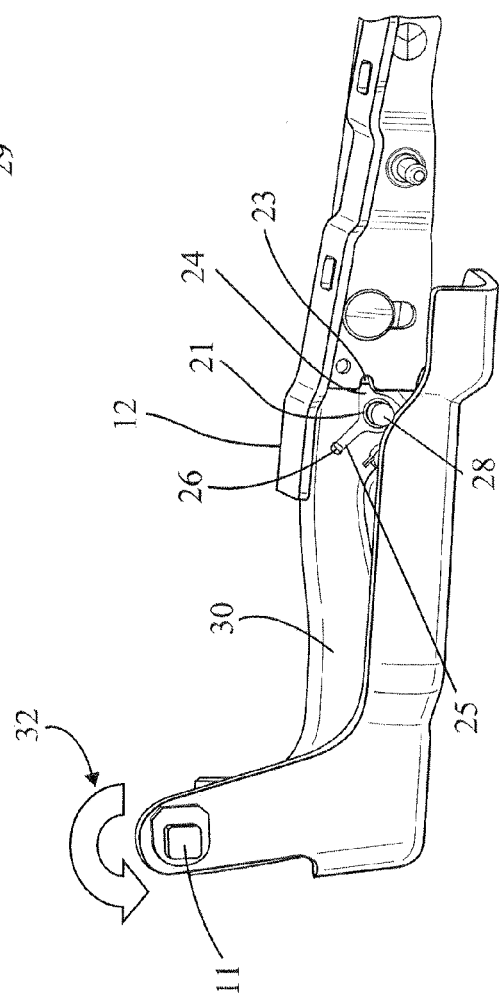

ACTIVE HINGE WITH RESET MECHANISM

CROSS-REFERENCES TO RELATED APPLICATIONS

This application claims the benefit of U.S. Provisional Application No. 61/513,114, filed Jul. 29, 2011, the entire contents of which is hereby incorporated by reference in this application.

FIELD OF INVENTION

The present invention relates to vehicle hood assemblies, and more particularly to a rest mechanism for a vehicle hood active hinge.

BACKGROUND OF THE INVENTION

Active hinges are used as part of a pedestrian protection system on vehicles. Active hinges are used to provide vehicle hoods with an additional degree of freedom in the hood's movement when a pedestrian is struck by a vehicle, to thereby reduce the injuries to the pedestrian when contacting the vehicle's hood as the pedestrian collides with the vehicle. After deployment, the active hinge's additional degree of freedom prevents the hood hinge from functioning normally.

BRIEF DESCRIPTION OF THE INVENTION

The present invention provides a manual reset feature for active hinges. The reset feature is used to lock the additional degree of freedom and permit the hinge to function. Thus, the present invention is directed to an active hinge with a reset mechanism that disables the additional degree of freedom in the hinge's movement to permit the trailing edge of the vehicle hood to lift when colliding with a pedestrian.

The active hinge includes a deployment bracket on which a reset clip is rotatably mounted, a hood bracket attached to the vehicle's hood, and a body bracket attached to the vehicle's body. The reset clip is comprised of an engagement tab and a locking tab located a predetermined angular distance away from the engagement tab around the circumference of the reset clip. To re-lock the movement between the deployment bracket and the hood bracket resulting from the hood bracket rotating around a degree of freedom pivot on the deployment bracket when a pedestrian collides with the vehicle, an engagement tab on the reset clip enters a notch in the hood bracket so that the reset clip rotates until a locking tab on the clip engages a hole in the deployment bracket. The locking tab engaging the hole prevents further rotation of the hood bracket in either direction, to thereby maintain the active hinge in a reset position.

BRIEF DESCRIPTION OF THE DRAWINGS

FIG. 5a is a side elevational view of the single pivot active hinge and reset clip of FIG. 1 mounted in a vehicle prior to a collision with a pedestrian.

FIG. 5b is a side elevational view of the mutli-bar active hinge and reset clip of FIG. 4 mounted in a vehicle prior to the vehicle colliding with a pedestrian.

FIG. 8 is a side perspective view of the single pivot active hinge in its additional degree of freedom configuration.

FIG. 9 is a side perspective view of the single pivot active hinge in its reset configuration with the reset clip engaged.

DETAILED DESCRIPTION OF THE INVENTION

As discussed above, active hinges are used as part of pedestrian protection systems on vehicles. Active hinges are used for the mounting of vehicle hoods on vehicle bodies in an effort to introduce an additional degree of freedom in the movement of a vehicle's hood when a pedestrian is struck by a vehicle to thereby reduce the injuries to pedestrians contacting the vehicle's hood when colliding with the vehicle.

Figure 1:
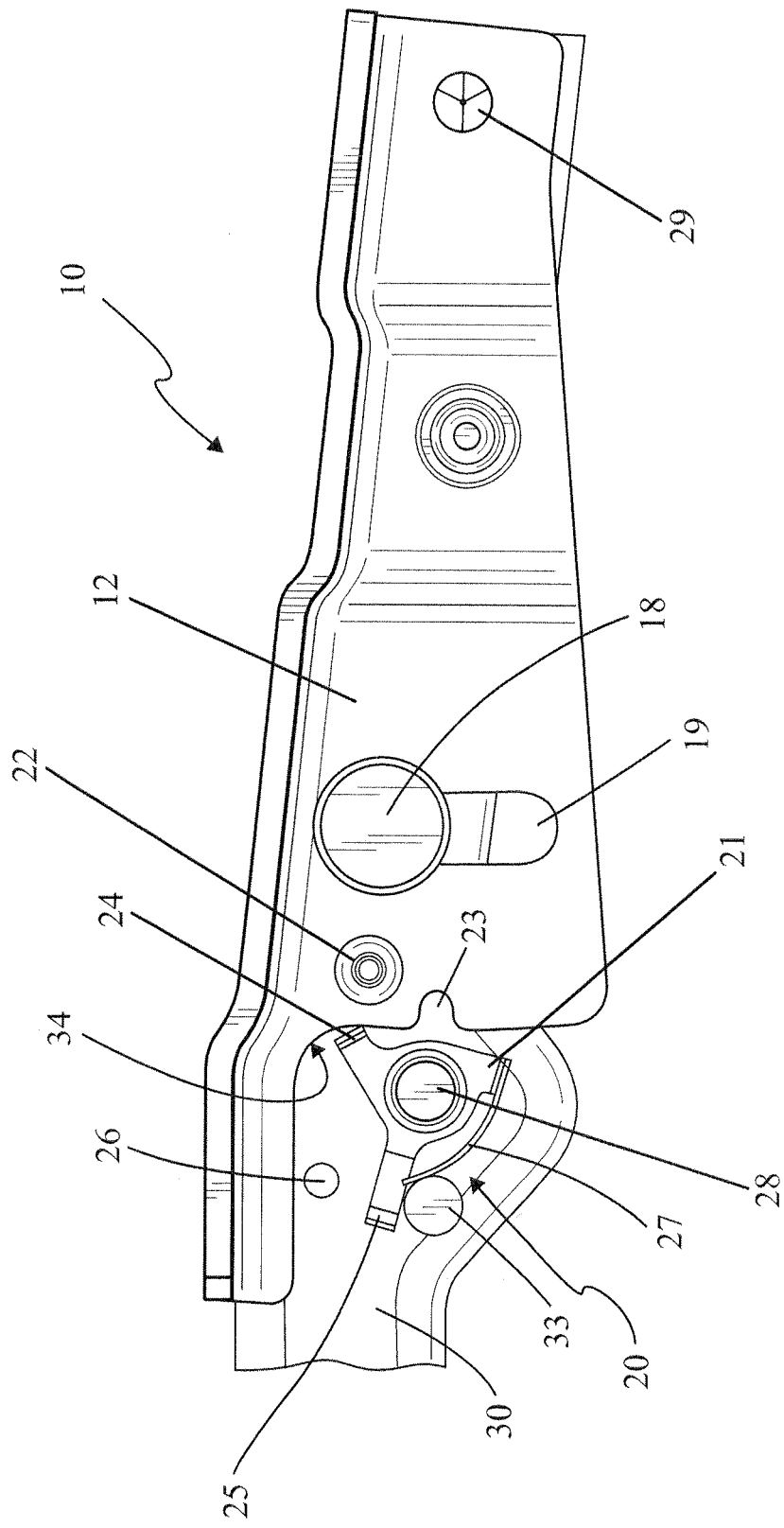
FIG. 1 is a side elevational view of a single pivot active hinge including a reset clip with the hinge being in a pre-deployed position.

FIG. 1 is a side elevational view of one embodiment of a single pivot active hinge 10 including a reset clip 21, with the hinge 10 being in a pre-deployed position. FIG. 5a shows the single pivot active hinge 10 mounted in a vehicle prior to the vehicle colliding with a pedestrian. As can be seen in FIG. 1, the active hinge 10 includes a hood bracket 12, a body bracket 16 and a deployment bracket 30 on which is mounted the reset clip 21 according the present invention. As can be seen in FIG. 5a, the active hinge hood bracket 12 is attached to the vehicle's hood 14, and the body bracket 16 is attached to the vehicle's body 15.

Figure 7:
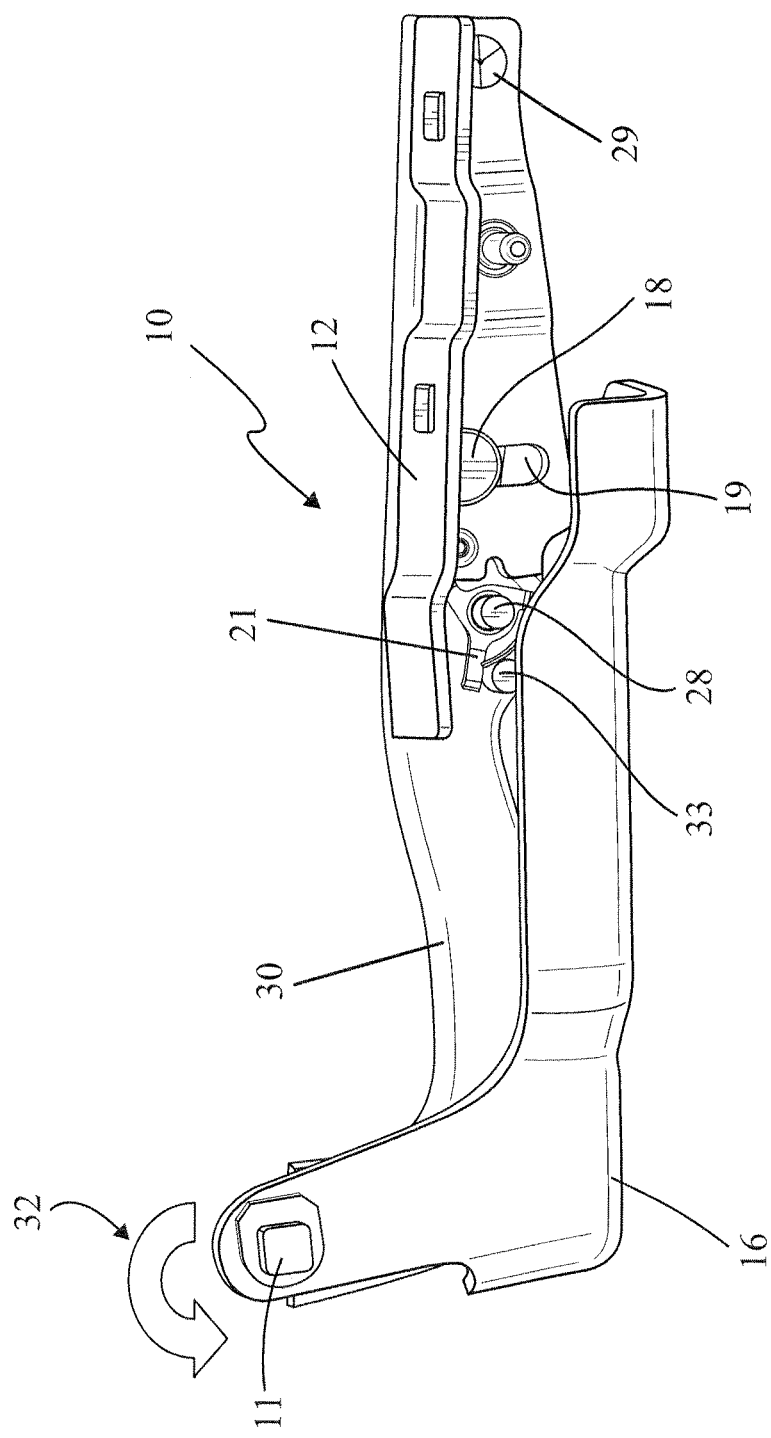
FIG. 7 is a side perspective view of the single pivot active hinge in its normal single degree of freedom configuration.

The body bracket 16 includes a pivot 11 about which the deployment bracket 30, and thus the hood 14, which is attached to the deployment bracket 30 through the hood bracket 12, can rotate from a closed position to an open position. The rotational motion 32 of hinge 10 about pivot 11 is depicted in FIG. 7. The vehicle hood 14 is also provided, at its forward end, with a locking arrangement, which includes a latch 17 and a striker 13. When the striker 13 is released from the latch 17, the hood 14 can be opened by rotating it about pivot 11.

Figure 6:
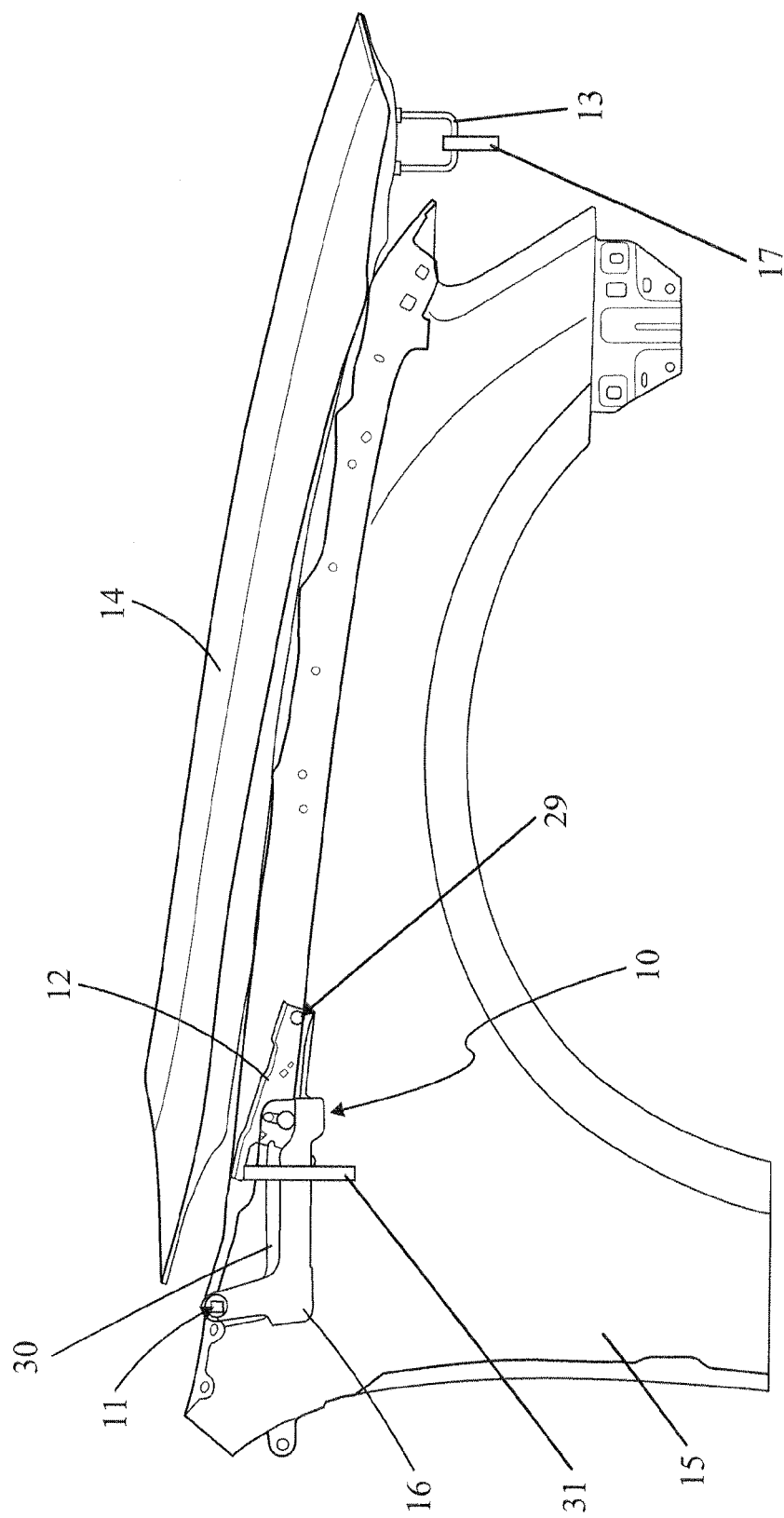
FIG. 6 is a side elevational view of the single pivot active hinge and reset clip of FIG. 1 mounted in a vehicle after the vehicle colliding with a pedestrian.

Active hinge 10 includes an additional degree of freedom in its movement to permit the trailing edge of vehicle hood 14 to lift, as shown in FIG. 6, when the vehicle collides with a pedestrian and while the striker is still engaged with the latch 17. In normal (or pre-collision) situations, this additional degree of freedom is disabled by a shear pin 22, shown in FIG. 1, which permits normal usage of the hood 14.

Figure 2:
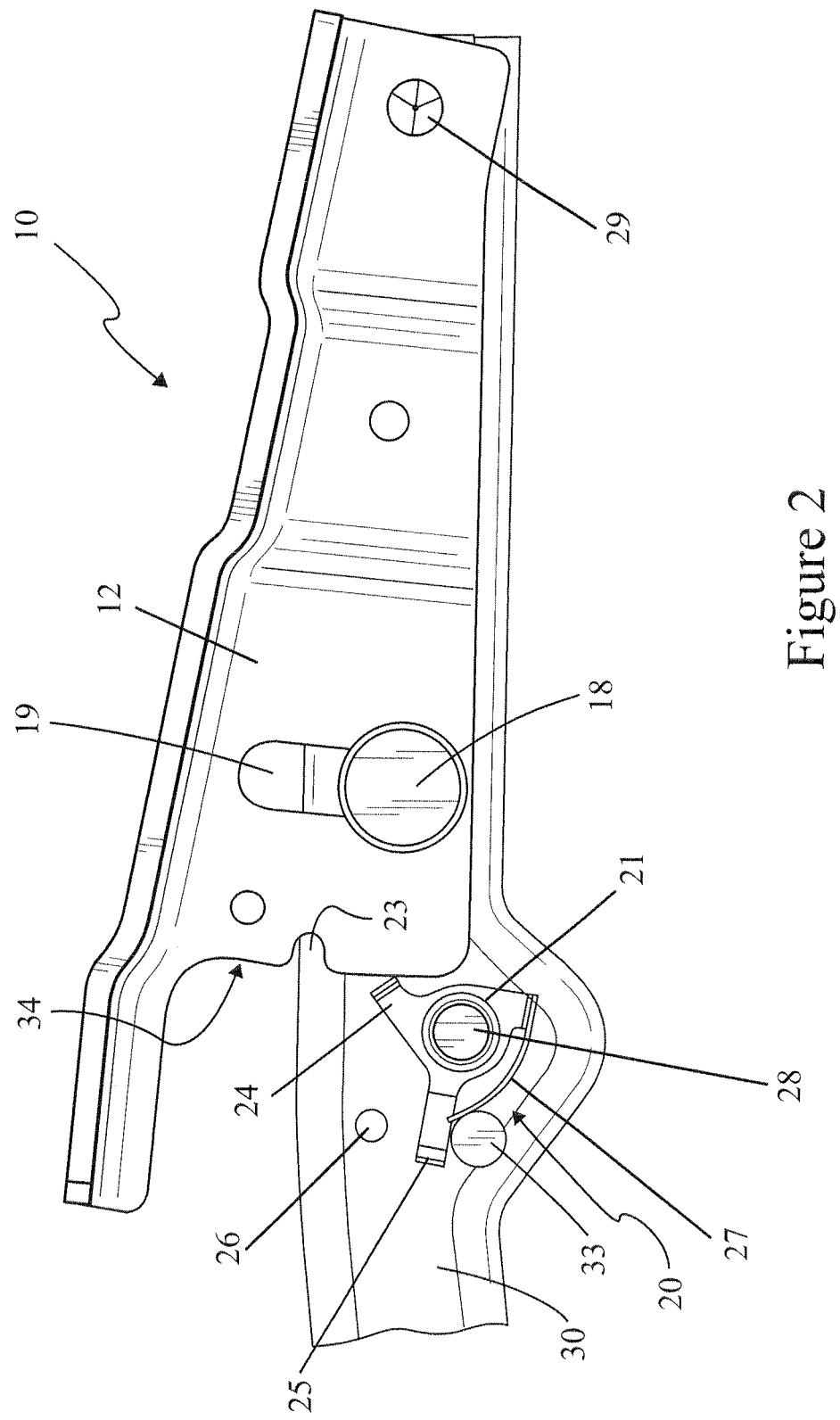
FIG. 2 is a side elevational view of the single pivot active hinge and reset clip of FIG. 1 with the hinge being in a deployed position.
Figure 3A:
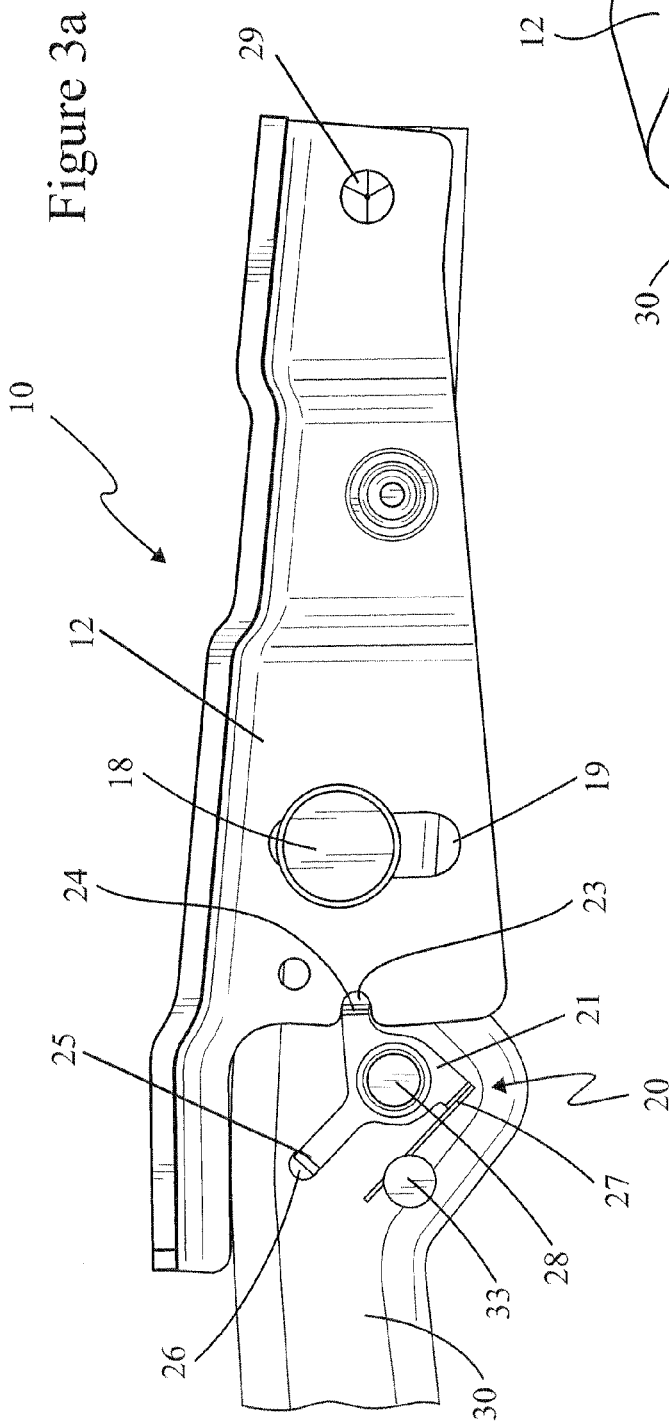
FIG. 3a is a side elevational view of the single pivot active hinge and reset clip of FIG. 1 with the hinge being in a reset position.
Figure 3B:
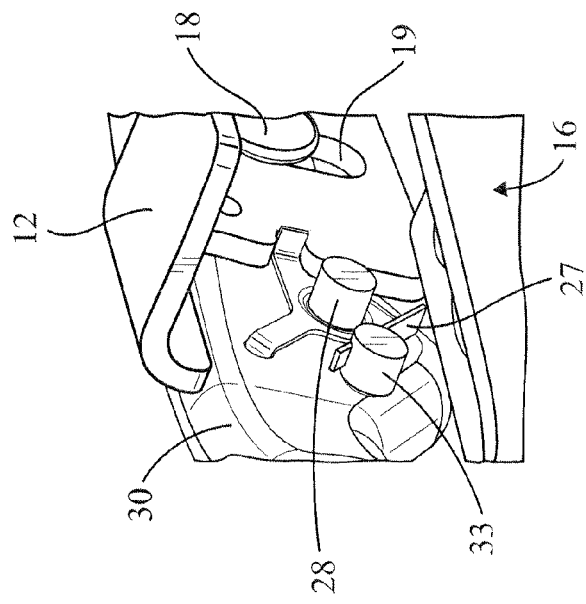
FIG. 3b is a partial side perspective view of the single pivot active hinge and reset clip of FIG. 1 with the hinge being in a reset position.

When a collision with a pedestrian is detected, an actuator 31, as shown in FIG. 6, applies an upward force on the hood bracket 12, which is sufficient to fracture the shear pin 22. The fracturing of shear pin 22 allows the hood bracket 12, and thus hood 14 which is attached to bracket 12, to pivot about an additional degree of freedom pivot 29 and reach a deployed position, as shown in FIGS. 2, 6 and/or 8. The movement of hood bracket 12, and thus hood 14, to the deployed position is limited by the movement of a pin 18 positioned within a guide slot 19 in hood bracket 12, as can be seen in FIGS. 1 and 2. In the deployed position, the hood 14 has sufficient clearance to allow unrestricted deformation of the hood 14 to "cushion" a pedestrian impact.

Active hinge 10 allows an additional degree of freedom in the movement of vehicle hood 14 in response to the vehicle colliding with a pedestrian, but without the active hinge 10 deforming or absorbing energy during the vehicle hood impacting with the pedestrian. Thus, when the additional movement of vehicle hood 14 is required, the shear pin 22 of active hinge 10 is fractured by means of actuator 31 or some other device applying an upward force on the hood bracket 12, as explained above. When shear pin 22 is fractured, hood bracket 12 is then able to pivot about the additional degree of freedom pivot 29 as the hinge 10 pivots about pivot 11. The rotation of hinge 10 about pivot 11 and the simultaneous rotation of hood bracket 12 about pivot 29 allow the vehicle hood 14 attached to hood bracket 12 to lift, as shown in FIG. 6, without permanently deforming the hinge 10, as shown in FIG. 2. The rotational motion 32 of hinge 10 about pivot 11 and the rotational motion 35 of hood bracket 12 about pivot 29 are depicted in FIG. 8.

When the additional degree of freedom in the movement of vehicle hood 14 is not required, the movement between deployment bracket 30 and hood bracket 12 caused by hood bracket 12 rotating about pivot 29 is disabled and locked by having reset clip 21 engage hood bracket 12. This restores active hinge 10 to a single degree of freedom operation, that is, the rotation of hinge 10 about pivot 11.

A hinge 10 reset mechanism 20 is shown is several operational positions in FIGS. 1-3b. The reset mechanism 20 includes a reset clip 21, a notch 23 in an edge 34 of hood bracket 12 and a hole in the deployment bracket 30 that are engaged by reset clip 21 and a spring arm 27 that also engages reset clip 21 and another pin 33. Reset clip 21 is shown in FIGS. 1-3b in several rotational positions that correspond to the several operational positions of reset mechanism 20 depicted in these figures. These rotational positions vary according to the position of hood bracket 12. Reset clip 21 includes an engagement tab 24, which, when active hinge 10 is in its pre-deployed position, is held against hood bracket 12 by means of a spring arm 27 that engages another pin 33 also mounted on deployment bracket 30.

During deployment of the active hinge 10, so as to allow vehicle hood 14 to lift as shown in FIG. 6, hood bracket 12 rotates about pivot 29. As hood bracket 12 rotates about pivot 29, engagement tab 24 slides along an edge 34 of hood bracket 12 and past a notch 23 in edge 34 until the deployed position shown in FIGS. 2, 6 and 8 reached by bracket 12. Engagement tab 24 slides past a notch 23 in edge 34 because the spring arm 27 and the pin 33 engaged by spring arm 27 prevent the reset clip 21, and thereby engagement tab 24 from rotating, so as to prevent tab 24 from entering notch 23.

After deployment of active hinge 10, to re-lock the movement between the deployment bracket 30 and the hood bracket 12 that results from bracket 12 rotating around pivot 29, a downward force is applied to the vehicle hood 14, and thus hood bracket 12. Application of the downward force causes engagement tab 24 to again slide along edge 34 of hood bracket 12 in the opposite direction, which allows engagement tab 24 to enter notch 23 in hood bracket 12. As engagement tab 24 enters notch 23 in hood bracket 12 and bracket 12 continues to move downward in response to the downward force, reset clip 21 is caused to rotate about pivot pin 28 until a locking tab 25 on reset clip 21 engages a hole 26 in the deployment bracket 30. Locking tab 25 engaging hole 26 prevents further rotation of hood bracket 12 in either direction, to thereby maintain active hinge 10 in a reset position shown in FIGS. 3 and 9.

Figure 4:
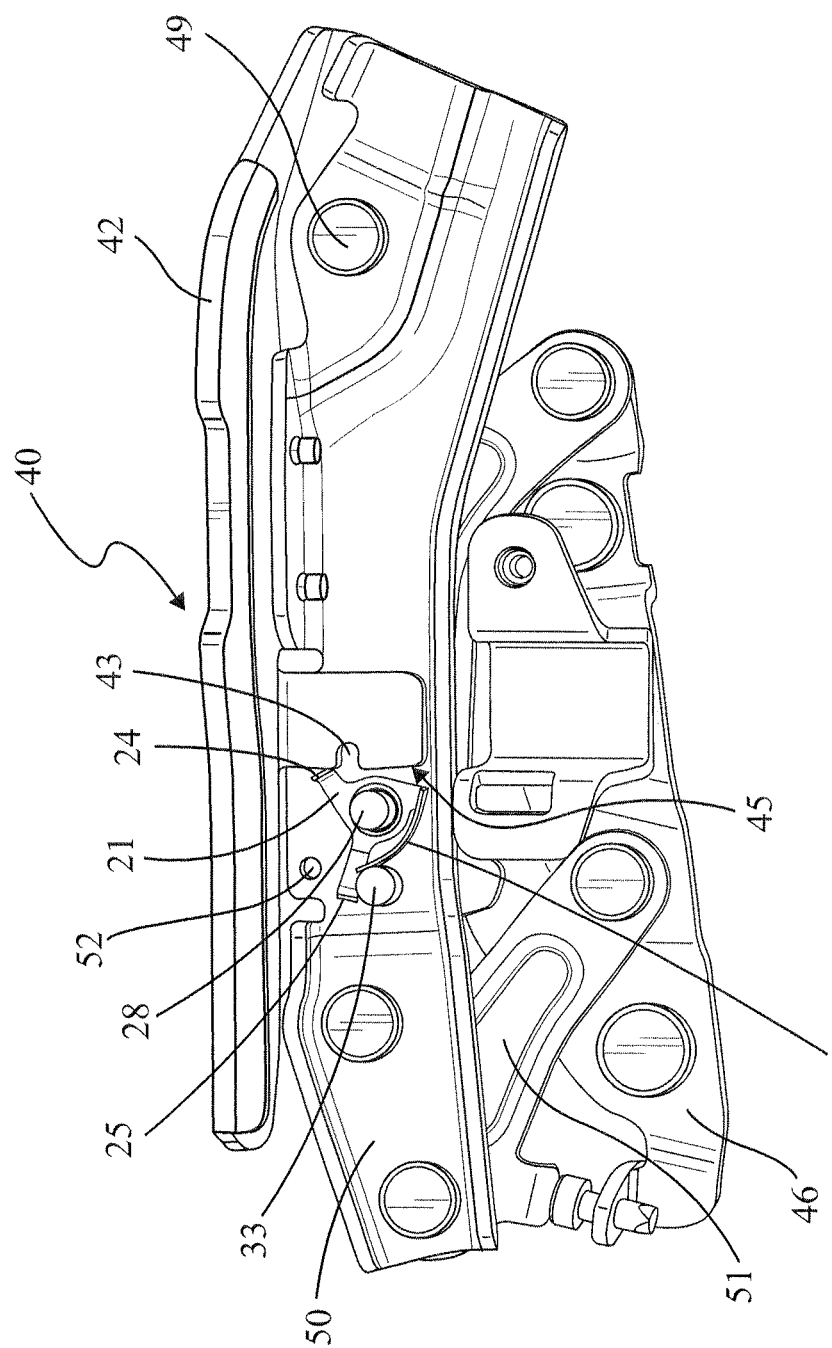
FIG. 4 is a side elevational view of a mutli-bar active hinge including a reset clip with the hinge being in a pre-deployed position.

The reset mechanism 20 and reset clip 21 and their operation shown in FIGS. 1-3 and 5a-9 can also be used in multi-bar active hinges, like the multi-bar active hinge 40 shown in FIG. 4. The embodiment of a multi-bar active hinge 40 shown in FIG. 4A is a four bar active hinge. A multi-bar active hinge, like hinge 40, is used where there is some physical barrier 47 preventing the proper placement of a hood pivot, like pivot 11, as shown in FIG. 5b. A multi-bar hinge 40 permits a "virtual" pivot 41 to be located where a physical pivot 11 cannot be located.

Multi-bar hinge 40 shown in FIG. 4 includes a hood bracket 42, which is engaged by reset pin 21 in a manner very similar to how rest pin 21 engages hood bracket 12 in the single pivot active hinge 10. Like edge 34 on hood bracket 12, which engagement tab 24 slides along, and notch 23 in edge 34 of hood bracket 12, which engagement tab 24 enters as hinge 10 is reset, hood bracket 42 of hinge 40 also includes a tab 48 with an edge 45, which engagement tab 24 slides along, and a notch 43 in edge 45, which engagement tab 24 of reset pin enters as hinge 40 is reset after deployment in response to a vehicle collision with a pedestrian. And, like reset clip 21 is caused to rotate about pivot pin 28 until a locking tab 25 on reset clip 21 engages a hole 26 in deployment bracket 30 of hinge 10, for hinge 40, locking tab 25 on reset clip 21 engages a hole 52 in deployment bracket 50 of hinge 40 as hood bracket 42 moves downward to a reset position in response to a downward force being applied to hood 14.

As can be seen in FIG. 4, the multi-bar hinge 40 also includes, in addition to the hood bracket 42, a body bracket 46 and a deployment bracket 50 on which is mounted the reset clip 21 according the present invention. As can be seen in FIG. 5b, the multi-bar hinge hood bracket 42 is attached to the vehicle's hood 14, and the body bracket 46 is attached to the vehicle's body 15. Pivotally mounted between deployment bracket 50 and body bracket 46 is a pivot bracket 51, which effects the rotation of the deployment bracket 50, the hood bracket 42 attached to the deployment bracket 50, and the hood 14 attached to the hood bracket 42. The rotational motion of deployment bracket 50 and hood bracket 42 that is effected using pivot bracket 51 results in vehicle hood 14 rotating from a closed position to an open position "around" virtual pivot point 41. But, here again, when a collision with a pedestrian is detected, an actuator, like the actuator 31 shown in FIG. 6, applies an upward force on the hood bracket 42, which is sufficient to fracture a shear pin, like the shear pin 22 shown in FIG. 1. The fracturing of shear pin allows the hood bracket 42, and thus hood 14 which is attached to bracket 42, to pivot about an additional degree of freedom pivot 49 and reach a deployed position.

Because no permanent deformation of the reset clip occurs during the deployment and resetting of the hinges 10 or 40, such hinges can be reused multiple times. Resetting a hinge, such as hinge 10 by way of example, to its original position can be achieved by: lifting locking tab 25, applying an upward force on hood bracket 12 to disengage engagement tab 24 from notch 23, and rotating the reset clip 21 to its pre-deployed position shown in FIG. 1. This allows hood bracket 12 to be set in its pre-deployed position, also shown in FIG. 1, and shear pin 22 to be replaced, thereby restoring the hinge 10 to its original working condition, as shown in FIG. 1. A similar action can be taken to reset hinge 40 after deployment so that hood bracket 42 to be set in its pre-deployed position, which is shown in FIG. 4, and a shear pin, like pin 22, to be replaced, thereby restoring the hinge 40 to its original working condition, as shown in FIG. 4.

While the invention has been described in connection with what is presently considered to be the most practical and preferred embodiment with regard to using it with vehicles having a hood and body, it is to be understood that the invention is not to be limited to the disclosed embodiment, but on the contrary, can be used with any application in which an active hinge might be used, and is intended to cover various modifications and equivalent arrangements included within the spirit and scope of the appended claims.

What is claimed is:

1. An active hinge comprising:
   a hood bracket for attachment to a vehicle hood,
   a body bracket for attachment to a vehicle body, and
   a deployment bracket rotatably attached to the body bracket,
   the hood bracket being rotatably attached to the deployment bracket at an one end of the deployment bracket so that the hood bracket can rotate from a pre-deployed position to a deployed position, and
   a reset clip rotatably mounted on the deployment bracket, the reset clip being comprised of an engagement tab and a locking tab located a predetermined angular distance away from the engagement tab around the circumference of the reset clip,
   the reset clip rotating, when the hood bracket is rotated relative to the deployment bracket from the deployed position towards a reset position, until the engagement tab on the reset clip enters a notch in the hood bracket and the locking tab engages a hole in the deployment bracket, to thereby prevent further rotation of the hood bracket and maintain the active hinge in a hinge reset position.

2. The active hinge of claim 1, wherein the hood bracket includes an edge along which the reset clip's engagement tab slides during rotation of the hood bracket from its pre-deployed position to its deployed position.

3. The active hinge of claim 2, wherein the notch in the hood bracket is in the edge of the hood bracket along which the reset clip's engagement tab slides.

4. The active hinge of claim 3, wherein the engagement tab is held against the hood bracket edge by a spring arm mounted on the deployment bracket.

5. The active hinge of claim 4, wherein the spring arm engages a pin mounted on the deployment bracket.

6. The active hinge of claim 3, wherein the spring arm and the pin engaged by spring arm engage the reset clip so as to prevent the reset clip, and thereby the reset clip's engagement tab from rotating as the engagement tab slides past the notch in the hood bracket edge, to thereby prevent the engagement tab from entering the notch in the hood bracket edge during rotation of the hood bracket from its pre-deployed position to its deployed position.

7. The active hinge of claim 3, wherein the spring arm and the pin engaged by spring arm engage the reset clip so as to allow the reset clip, and thereby the reset clip's engagement tab to rotate as the engagement tab slides along the hood bracket edge to the notch in the hood bracket edge, to thereby allow the engagement tab to enter the notch in the hood bracket edge during rotation of the hood bracket from its deployed position to its pre-deployed position, to thereby maintain the active hinge in a reset position by preventing the hood bracket from rotating further relative to the deployment bracket.

8. The active hinge of claim 1, wherein the locking tab can be lifted out of the hole in the deployment bracket, so that an upward force can be applied to the hood bracket to thereby allow the engagement tab to be disengaged from the notch, and the reset clip rotated to a pre-deployed position.

9. The active hinge of claim 1 further comprising a shear pin engaging the hood bracket and the deployment bracket, so as to disable the hood bracket from rotating around the second end of the deployment bracket from the hood bracket's pre-deployed position to its deployed position.

10. The active hinge of claim 1 further comprising a pin mounted on the deployment bracket and positioned within a guide slot in the hood bracket, so as to limit movement of the hood bracket to its deployed position.

11. The active hinge of claim 1, wherein the deployment bracket is rotatably attached at a first end of the deployment bracket to the body bracket.

12. The active hinge of claim 1 further comprising a pivot bracket rotatably mounted between the deployment bracket and the body bracket, such that the deployment bracket is rotatably attached to the body bracket through the pivot bracket.

13. The active hinge of claim 1, wherein the pivot bracket being rotatably mounted between the deployment bracket and the body bracket effects a rotational motion of the deployment bracket and the hood bracket attached to the deployment bracket that results in the vehicle hood being rotatable around a virtual pivot point from a closed position to an open position.

14. An active hinge comprising:
    a hood bracket for attachment to a vehicle hood,
    a body bracket for attachment to a vehicle body, and
    a deployment bracket rotatably attached to the hood bracket at an one end of the deployment bracket so that the hood bracket can rotate from a pre-deployed position to a deployed position,
    a pivot bracket rotatably mounted between the deployment bracket and the body bracket, the pivot bracket effecting a rotational motion of the deployment bracket and the hood bracket attached to the deployment bracket that allows the vehicle hood to be rotatable around a virtual pivot point from a closed position to an open position, and
    a reset clip rotatably mounted on the deployment bracket, the reset clip being comprised of an engagement tab and a locking tab located a predetermined angular distance around the circumference of the reset clip away from the engagement tab,
    the reset clip rotating, when the hood bracket is rotated relative to the deployment bracket from the deployed position towards a reset position, until the engagement tab on the reset clip enters a notch in the hood bracket and the locking tab engages a hole in the deployment bracket, to thereby prevent further rotation of the hood bracket and maintain the active hinge in a hinge reset position.

15. The active hinge of claim 14, wherein the engagement tab is held against the hood bracket edge by a spring arm and pin mounted on the deployment bracket, the spring arm and pin engaging the reset clip so as to prevent the reset clip, and thereby the reset clip engagement tab from rotating as the engagement tab slides past the notch in the hood bracket, to thereby prevent the engagement tab from entering the notch in the hood bracket during rotation of the hood bracket from its pre-deployed position to its deployed position, and to allow the engagement tab to enter the notch in the hood bracket edge during rotation of the hood bracket from its deployed position to its pre-deployed position to thereby maintain the active hinge in a reset position by preventing the hood bracket from rotating further relative to the deployment bracket.

16. A reset mechanism for an active hinge comprising a first movable bracket for attachment to a first, movable member, a second bracket for attachment to a second member about which the first movable member rotates, and a third bracket rotatably attached to the second bracket, the first bracket also being rotatably attached to the third bracket at one end so that the first bracket can rotate from a pre-deployed position to a deployed position, the reset mechanism comprising:

a reset clip rotatably mounted on the third bracket, the reset clip being comprised of an engagement tab and a locking tab located a predetermined angular distance away from the engagement tab around the circumference of the reset clip, the reset clip rotating, when the first bracket is rotated relative to the third bracket from the deployed position towards a reset position, until the engagement tab on the reset clip enters a notch in the first bracket and the locking tab engages a hole in the third bracket, to thereby prevent further rotation of the first bracket and maintain the active hinge in a hinge reset position.

17. The reset mechanism of claim 16, wherein the engagement tab is held against the first bracket by a spring arm mounted on the third bracket, and wherein the spring arm engages a pin mounted on the third bracket.

18. The reset mechanism of claim 17, wherein the spring arm and the pin engage the reset clip so as to prevent the reset clip, and thereby the reset clip engagement tab from rotating as the engagement tab slides past the notch in the first bracket, to thereby prevent the engagement tab from entering the notch in the first bracket during rotation of the first bracket from its pre-deployed position to its deployed position.

19. The reset mechanism of claim 17, wherein the spring arm and the pin engage the reset clip so as to allow the reset clip, and thereby the reset clip engagement tab to rotate as the engagement tab slides along the first bracket to the notch in the first bracket, to thereby allow the engagement tab to enter the notch in the first bracket during rotation of the first bracket from its deployed position to its pre-deployed position, to thereby maintain the active hinge in a reset position by preventing the first bracket from rotating further relative to the third bracket.

20. The reset mechanism of claim 16, wherein the locking tab can be lifted out of the hole in the third bracket, so that an upward force can be applied to the first bracket to thereby allow the engagement tab to be disengaged from the notch, and the reset clip rotated to a pre-deployed position.

\* \* \* \* \*